United States Patent
Wu et al.

(10) Patent No.: US 10,455,304 B2
(45) Date of Patent: **\*Oct. 22, 2019**

(54) METHOD AND APPARATUS FOR AUTHENTICATION IN PASSIVE OPTICAL NETWORK

(71) Applicant: Huawei Technologies Co., Ltd., Shenzhen (CN)

(72) Inventors: Wei Wu, Shenzhen (CN); Hai Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,091

(22) Filed: Mar. 19, 2018

(65) Prior Publication Data
US 2018/0213308 A1    Jul. 26, 2018

Related U.S. Application Data

(63) Continuation of application No. 15/497,029, filed on Apr. 25, 2017, now Pat. No. 9,942,634, which is a
(Continued)

(30) Foreign Application Priority Data

Jul. 13, 2007    (CN) .......................... 2007 1 0119103

(51) Int. Cl.
*H04J 14/00* (2006.01)
*H04Q 11/00* (2006.01)
(Continued)

(52) U.S. Cl.
CPC ..... *H04Q 11/0067* (2013.01); *H04B 10/2503* (2013.01); *H04B 10/27* (2013.01);
(Continued)

(58) Field of Classification Search
CPC .. H04Q 11/0067; H04J 14/0238; H04B 10/27
See application file for complete search history.

(56) References Cited

U.S. PATENT DOCUMENTS 6,546,014 B1    4/2003    Kramer et al.
8,406,628 B2    3/2013    Wu et al.
(Continued)

FOREIGN PATENT DOCUMENTS

CN    1855813 A    11/2006
CN    1941009 A    4/2007
(Continued)

OTHER PUBLICATIONS

U.S. Appl. No. 15/497,029, filed Apr. 25, 2017.
(Continued)

*Primary Examiner* — Dzung D Tran
(74) *Attorney, Agent, or Firm* — Leydig, Voit & Mayer, Ltd.

(57) ABSTRACT

A method and apparatus for authentication in a passive optical network are disclosed. In the disclosure, a first terminal serial number of an ONU and a first logic registration code are transmitted from the ONU to an OLT; if the OLT determines that the first terminal serial number does not match a second terminal serial number stored on the OLT, the OLT judges whether the first logic registration code received from the ONU matches a second logic registration code stored on the OLT; the OLT stores the first terminal serial number received from the ONU on the OLT if the first logic registration code matches the second logic registration code.

17 Claims, 4 Drawing Sheets

Related U.S. Application Data continuation of application No. 15/184,661, filed on Jun. 16, 2016, now Pat. No. 9,674,172, which is a continuation of application No. 14/282,642, filed on May 20, 2014, now Pat. No. 9,397,777, which is a continuation of application No. 13/770,743, filed on Feb. 19, 2013, now Pat. No. 8,774,629, which is a continuation of application No. 12/604,085, filed on Oct. 22, 2009, now Pat. No. 8,406,628, which is a continuation of application No. PCT/CN2008/071619, filed on Jul. 11, 2008.

(51) Int. Cl.
| | | |
|---|---|---|
| *H04B 10/27* | (2013.01) | |
| *H04J 3/16* | (2006.01) | |
| *H04L 29/06* | (2006.01) | |
| *H04J 14/02* | (2006.01) | |
| *H04B 10/25* | (2013.01) | |

(52) U.S. Cl.
CPC ........ *H04J 3/1694* (2013.01); *H04J 14/0238* (2013.01); *H04L 63/08* (2013.01); *H04L 63/0876* (2013.01); *H04Q 2011/0079* (2013.01)

(56) References Cited

U.S. PATENT DOCUMENTS

| | | | |
|---|---|---|---|
| 8,774,629 B2 | 7/2014 | Wu et al. | |
| 9,397,777 B2* | 7/2016 | Wu ..................... | H04J 14/0238 |
| 9,674,172 B2 | 6/2017 | Wu et al. | |
| 2004/0062256 A1* | 4/2004 | Takeuchi ............ | H04L 12/2801 |
| | | | 370/401 |
| 2004/0179521 A1 | 9/2004 | Kim | |
| 2005/0083950 A1 | 4/2005 | Choi et al. | |
| 2005/0158048 A1 | 7/2005 | Sung et al. | |
| 2007/0189771 A1 | 8/2007 | Kim | |
| 2007/0264017 A1 | 11/2007 | Mizutani et al. | |
| 2007/0274720 A1 | 11/2007 | Menasco et al. | |
| 2008/0232819 A1* | 9/2008 | Mukai ..................... | H04L 47/72 |
| | | | 398/168 |
| 2008/0292313 A1 | 11/2008 | Mahony et al. | |
| 2009/0049532 A1 | 2/2009 | Gao et al. | |
| 2009/0263132 A1 | 10/2009 | Rafel et al. | |
| 2014/0255030 A1 | 9/2014 | Wu et al. | |

FOREIGN PATENT DOCUMENTS

| | | |
|---|---|---|
| CN | 1968089 A | 5/2007 |
| CN | 1988552 A | 6/2007 |
| CN | 1997026 A | 7/2007 |
| CN | 101083589 A | 12/2007 |
| CN | 101145903 A | 3/2008 |
| CN | 101478702 B | 11/2012 |
| EP | 1458164 A2 | 9/2004 |
| KR | 20040049730 A | 6/2004 |
| KR | 20050003642 A | 1/2005 |

OTHER PUBLICATIONS

U.S. Appl. No. 15/184,661, filed Jun. 16, 2016.
U.S. Appl. No. 14/282,642, filed May 20, 2014.
U.S. Appl. No. 13/770,743, filed Feb. 19, 2013.
U.S. Appl. No. 12/604,085, filed Oct. 22, 2009.
U.S. Appl. No. 15/912,107, filed Mar. 5, 2018.
Pesavento et al., "Ethernet Passive Optical Network (EPON) architecture for broadband access," Optical Networks Magazine, vol. 4, No. 1, XP001162954, Standards, (Jan./Feb. 2003).
Roh et al.,"Design of Authentication and Key Exchange Protocol in Ethernet Passive Optical Networks," ICCSA 2004, XP019006729, Springer-Verlag Berlin Heidelberg (2004).
"Series G: Transmission Systems and Media, Digital Systems and Networks—Digital sections and digital line system—Optical line systems for local and access networks: Gigabit-capable Passive Optical Networks (GPON): General characteristics," G.984.1,International Telecommunication Union, Geneva, Switzerland (Mar. 2003).
"Series G: Transmission Systems and Media, Digital Systems and Networks—Digital sections and digital line system—Optical line systems for local and access networks: Gigabit-capable Passive Optical Networks (G-PON): ONT management and control interface specification," G984.4, International Telecommunication Union, Geneva, Switzerland (Jun. 2004).
"Series G: Transmission Systems and Media, Digital Systems and Networks—Digital sections and digital line system—Optical line systems for local and access networks:Gigabit-capable Passive Optical Networks (G-PON): ONT management and control interface specification—Amendment 1," G984.4 Amendment 1, International Telecommunication Union, Geneva, Switzerland (Jun. 2005).
"Series G: Transmission Systems and Media, Digital Systems and Networks—Digital sections and digital line system—Optical line systems for local and access networks: Gigabit-capable Passive Optical Networks (G-PON): ONT management and control interface specification—Amendment 2," G984.4 Amendment 2, International Telecommunication Union, Geneva, Switzerland (Mar. 2006).
"Series G: Transmission Systems and Media, Digital Systems and Networks—Digital sections and digital line system—Optical line systems for local and access networks: Gigabit-capable Passive Optical Networks (G-PON): Transmission convergence layer specification—Amendment 1," G984.3 Amendment 1, International Telecommunication Union, Geneva, Switzerland (Jul. 2005).
"Series G: Transmission Systems and Media, Digital Systems and Networks—Digital sections and digital line system—Optical line systems for local and access networks:Gigabit-capable Passive Optical Networks (G-PON): Physical Media Dependent (PMD)layer specification—Amendment 1: New Appendix III—Industry best practice for 2.488 Gbit/s downstream, 1.244 Gbit/s upstream G-PON," G.984.2 Amendment 1, International Telecommunication Union, Geneva, Switzerland (Feb. 2006).
"Series G: Transmission Systems and Media, Digital Systems and Networks—Digital sections and digital line system—Optical line systems for local and access networks: Gigabit-capable Passive Optical Networks (G-PON): Transmission convergence layer specification—Amendment 2," G984.3 Amendment 2, International Telecommunication Union, Geneva, Switzerland (Mar. 2006).
"Series G: Transmission Systems and Media, Digital Systems and Networks; Digital sections and digital line system—Optical line systems for local and access networks; Gigabit-capable Passive Optical Networks (GPON): Physical Media Dependent (PMD) layer specification," G.984.2, International Telecommunications Union, Geneva, Switzerland (Mar. 2003).
"Series G: Transmission Systems and Media, Digital Systems and Networks; Implementers' Guide for ITU-T Rec. G.984.3 (Feb. 2004) Gigabit-capable Passive Optical Networks (G-PON): Transmission convergence layer specification," G.984.3,International Telecommunications Union, Geneva, Switzerland (Feb. 17, 2006).
Series G: Transmission Systems and Media, Digital Systems and Networks. Digital sections and digital line system—Optical line systems for local and access networks. Gigabit-capable Passive Optical Networks (GPON): Transmission convergence layer specification, Amendment 3, G.984.3, International Telecommunications Union, Geneva, Switzerland (Dec. 2006).
Murakami et al.,"Authentication and Encryption in EPON," IEEE802. 3ah, XP007901700, Institute of Electrical and Electronics Engineers, New York, New York, (Jul. 2002).
"Series G: Transmission Systems and Media, Digital Systems and Networks Digital sections and digital line system—Optical line systems for local and access networks, Gigabit-capable Passive Optical Networks (G-PON): ONT management and control interface specification Amendment 3," G.984.4 Amendment 3, International Telecommunications Union, Geneva, Switzerland (Dec. 2006).
"Series G: Transmission Systems and Media, Digital Systems and Networks Digital sections and digital line system—Optical line

(56) References Cited

OTHER PUBLICATIONS systems for local and access networks, Gigabit-capable Passive Optical Networks (G-PON): Transmission convergence layer specification," G.984.3,International Telecommunications Union, Geneva, Switzerland (Feb. 2004).

* cited by examiner

METHOD AND APPARATUS FOR AUTHENTICATION IN PASSIVE OPTICAL NETWORK

CROSS-REFERENCE TO RELATED APPLICATIONS

This application is a continuation of U.S. patent application Ser. No. 15/497,029 filed on Apr. 25, 2017, which is a continuation of U.S. patent application Ser. No. 15/184,661, filed on Jun. 16, 2016, now U.S. Pat. No. 9,674,172, which is a continuation of U.S. patent application Ser. No. 14/282,642, filed on May 20, 2014, now U.S. Pat. No. 9,397,777, which is a continuation of U.S. patent application Ser. No. 13/770,743, filed on Feb. 19, 2013, now U.S. Pat. No. 8,774,629, which is a continuation of U.S. patent application Ser. No. 12/604,085, filed on Oct. 22, 2009, now U.S. Pat. No. 8,406,628, which is a continuation of International Application No. PCT/CN2008/071619, filed on Jul. 11, 2008, which claims the priority of Chinese Patent Application No. 200710119103.X, filed on Jul. 13, 2007. The afore-mentioned patent applications are hereby incorporated by reference in their entireties.

FIELD OF TECHNOLOGY

The present invention relates to a network communication technology, in particular, to a method and apparatus for authentication in a passive optical network (PON).

BACKGROUND

The PON technique is a point-to-multipoint optical fiber access technique. A PON is generally composed of an optical line terminal (OLT) at the central office end, an optical network unit/optical network terminal (ONU/ONT) at the user end, and an optical distribution network (ODN). One PON port of the OLT may be accessed by a plurality of ONUs/ONTs. The difference between the ONU and the ONT lies in that the ONT is directly located at the user side, while other networks exist between the ONU and the user side, such as the Ethernet, there-between.

Currently, the detection and authentication on the ONU/ONT are performed during the registration of the ONU/ONT, and the registration process of the ONU/ONT is shown in FIG. 1.

In FIG. 1, Step 1: The OLT sends a message to each ONU/ONT for requesting the ONU/ONT to report a serial number (SN).

Step 2: The ONU/ONT that receives the above message reports its SN to the OLT.

Step 3: The OLT receives the SN, and detects the SN, i.e. detects the ONU/ONT. The detection process is implemented as follows. An SN is pre-configured in the OLT, and the OLT determines whether the received SN matches with the pre-configured SN. The detection on the ONU/ONT succeeds if the received SN matches with the pre-configured SN; the detection on the ONU/ONT fails if the received SN does not match with the pre-configured SN. The OLT sends an ONU-ID corresponding to the SN according to a corresponding relationship between the pre-configured SN and the ONU-ID to the ONU/ONT that is successfully detected. The ONU-ID is unique at one PON port.

Step 4: The OLT performs ranging on the ONU/ONT assigned with the ONU-ID.

Step 5: The OLT sends a request message to the ONU/ONT on which the ranging is performed, for requesting the ONU/ONT to report a password.

Step 6: The ONU/ONT that receives the request message reports its password to the OLT.

Step 7: The OLT performs authentication on the ONU/ONT according to the received password, and if the authentication is passed, the registration of the ONU/ONT succeeds.

During the implementation of the present invention, the inventor finds out the following defects in the prior art.

In the abovementioned detection and authentication on the ONU/ONT, a corresponding relationship between the SN and the ONU-ID should be statically pre-configured in the OLT. Therefore, the OLT cannot automatically detect and authenticate the ONU/ONT, so that the flexibility of the detection and authentication of the ONU/ONT is poor. In addition, the SN in the OLT is usually managed by an operation management system. When providing the ONU/ONT to the user, the operation management system records the SN of the provided ONU/ONT, and pre-configures the SN in the OLT. When it is intended to replace the ONU/ONT due to problems such as equipment failure, the operation management system updates the SN recorded in the operation management system, and updates the SN in the OLT. That is to say, the operation management system adopts a static management scheme for the SN recorded in the operation management system and the SN in the OLT. This static management scheme results in an increased maintenance cost of the operation management system, the OLT, and the ONU/ONT, and thus reduces the maintainability of the operation management system, the OLT, and the ONU/ONT.

SUMMARY

Accordingly, various embodiments of the present invention provide a method, equipment, and operation management system for detecting and authenticating a terminal in a passive optical network, which realizes the automatic detection and authentication of the terminal, thereby improving the flexibility of terminal detection and authentication as well as enhancing the maintainability of the central office end and the terminal.

In an embodiment of the present invention, a method for detecting and authenticating a terminal in the passive optical network is provided. The terminal has a logic registration code, and the method includes the following steps.

A central office end receives the logic registration code sent by the terminal.

The central office end judges whether the logic registration code sent by the terminal matches with a logic registration code stored at the central office end, and determines that the terminal is a valid terminal if the logic registration code sent by the terminal matches with the logic registration code stored at the central office end.

The central office end records a terminal serial number from the valid terminal and a terminal identifier assigned to the valid terminal.

In an embodiment of the present invention, network equipment applied to a central office end in the passive optical network is further provided. The network equipment includes a first storing module, a receiving module, a determining module, an assigning module, and a second storing module.

The first storing module is adapted to store a logic registration code of a terminal.

The receiving module is adapted to receive a logic registration code and a terminal serial number sent by the terminal.

The judging module is adapted to judge whether the logic registration code received by the receiving module matches with the logic registration code stored in the first storing module, and output a judgment result.

The assigning module is adapted to assign a terminal identifier to the terminal and output the terminal identifier.

The second storing module is adapted to store the terminal serial number received by the receiving module and the terminal identifier output by the assigning module after the judging module outputs the matched judgment result information.

In an embodiment of the present invention, an operation management system applied to a central office end in the passive optical network is further provided. The operation management system includes a logic registration code module and a serial number module.

The logic registration code module is adapted to store a logic registration code, assign the logic registration code to a user, and transmit the logic registration code assigned to the user to an optical line terminal.

The serial number module is adapted to receive a serial number of a valid terminal transmitted from the optical line terminal and store the serial number.

In an embodiment of the present invention, a terminal equipment applied to a user end in the passive optical network is further provided. The terminal equipment includes a receiving and storing module and a transmitting module.

The receiving and storing module is adapted to receive and store a logic registration code of the terminal equipment.

The transmitting module is adapted to transmit the logic registration code stored in the receiving and storing module to a central office end according to a request of the central office end received by the terminal equipment.

Seen from the above technical solutions, in the embodiments of the present invention, it is unnecessary to statically configure the terminal serial number at the central office end. Instead, a logic registration code is adopted during the detection and authentication process, so that after the authentication is passed, the terminal serial number acquired from the valid terminal and the terminal identifier assigned to the valid terminal are recorded, and thus the central office end may automatically detect and authenticate the terminal. Besides, by recording the terminal serial number acquired from the valid terminal and the terminal identifier assigned to the valid terminal by the central office end, the central office end may dynamically manage the terminal serial number and the terminal identifier, so as to reduce the maintenance cost of the central office end and the terminal. Therefore, the technical solutions provided by the embodiments of the present invention not only improve the flexibility of terminal detection and authentication but also enhance the maintainability of the central office end and the terminal.

DETAILED DESCRIPTION

Figure 1:
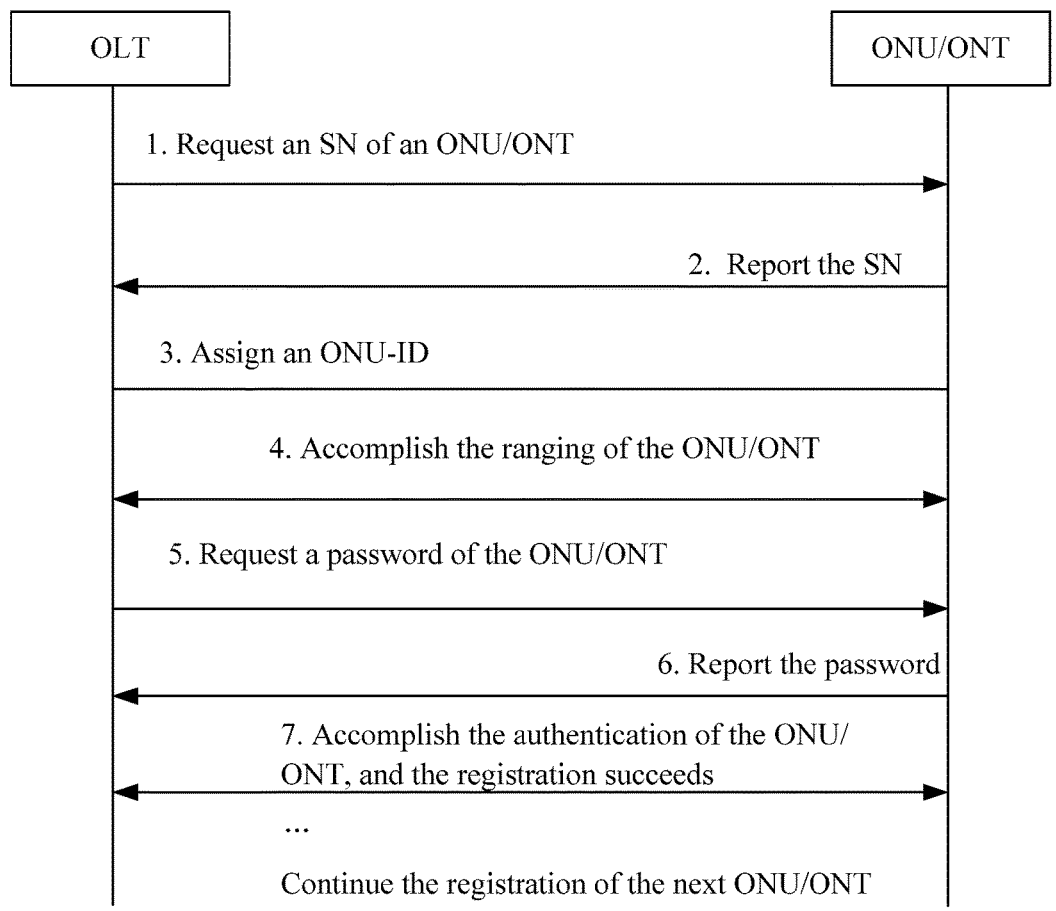
FIG. 1 is a schematic view illustrating a registration process of an ONU/ONT in the prior art.

In an embodiment of the present invention, a logic registration code of a terminal is employed to realize the automatic detection and authentication of the terminal. The method for detecting and authenticating a terminal provided in the embodiments of the present invention is illustrated in detail below.

In the embodiments of the present invention, the terminal, such as an ONU/ONT, has a corresponding logic registration code. The logic registration code of the terminal may be assigned by a central office end to the terminal during a service application of a user. After assigning the logic registration code to the terminal, the central office end needs to record the logic registration code assigned to the terminal. For example, an operation management system at the central office end assigns a logic registration code to the terminal, stores the assigned logic registration code, and transmits the logic registration code that is assigned to the terminal to an OLT at the central office end. Then, the OLT stores the received logic registration code. The logic registration code may be dynamically generated by the central office end. Moreover, the logic registration code is unique within a certain range. For example, under a PON port, the logic registration code of the terminal is unique. The logic registration code of the terminal may also be unique in the global range. In the embodiments of the present invention, it is not limited whether or not the logic registration code of the terminal has a unique range, what the specific implementation manner of the logic registration code is, or which specific equipment at the central office end is adapted to generate the logic registration code.

During the terminal detection and authentication process, the terminal first acquires the logic registration code thereof, and then transmits the acquired logic registration code to the central office end. In order to acquire the logic registration code, the terminal may receive an externally input logic registration code. For example, local command lines, Web pages, or other means may be provided in the terminal to receive the externally input logic registration code. The terminal may also generate the logic registration code based on a certain predetermined rule according to the externally input information. In this manner, the logic registration code generated by the terminal is identical to the logic registration code stored at the central office end. The terminal detection and authentication process may be accomplished during the registration of the terminal. More specifically, the terminal may transmit the logic registration code to the central office end during the registration. In the embodiments of the present invention, it is possible that the terminal detection and authentication process is realized independently or along with other processes.

The terminal may transmit the logic registration code to the central office end by using an existing message, or by using a new message specially defined for transmitting the logic registration code. Moreover, during the transmission of the logic registration code, the terminal may transmit the logic registration code by the encryption means or by other means. In the embodiments of the present invention, the specific implementation manner of the existing message and the specific structure of the newly defined message are not limited herein.

After receiving the logic registration code transmitted from the terminal, the central office end performs authentication on the terminal by using the pre-stored logic registration code and the logic registration code transmitted from the terminal. For example, the central office end determines whether the logic registration code transmitted from the terminal matches with the pre-stored logic registration code, and determines that the terminal is a valid terminal if the logic registration code sent from the terminal matches with the logic registration code stored at the central office end; determines that the terminal is an invalid terminal if the logic registration code sent from the terminal does not match with the logic registration code stored at the central office end.

When judging that the terminal is a valid terminal, the central office end records the terminal serial number acquired from the valid terminal and the terminal identifier assigned to the valid terminal by the central office end. In the embodiments of the present invention, the terminal serial number of the valid terminal recorded at the central office end is acquired from the valid terminal. In view of this, in the embodiments of the present invention, it is unnecessary to pre-configure the terminal serial number at the central office end. Though, in the embodiments of the present invention, the logic registration code of the terminal is pre-configured at the central office end, when the terminal needs to be replaced due to problems such as a failure, the logic registration code in the original terminal may also be used in the newly replaced terminal, and the central office end performs authentication on the terminal based on the logic registration code. Therefore, the central office end may automatically detect the valid terminal, and automatically acquire the terminal serial number and the terminal identifier of the valid terminal. As such, the process of statically configuring the serial number of the newly replaced terminal by the central office end during the terminal replacement by the user can be avoided.

The central office end may record the terminal identifier of the terminal in the following manners. For example, the central office end may assign the terminal identifier to the terminal before determining that the terminal is the valid terminal, and record the terminal identifier of the valid terminal after determining that the terminal is the valid terminal. Or, the central office end may assign the terminal identifier to the terminal after determining that the terminal is the valid terminal, and record the terminal identifier of the valid terminal. Furthermore, the central office end may assign a temporary terminal identifier to the terminal before determining that the terminal is the valid terminal, then assign a formal terminal identifier to the terminal after determining that the terminal is the valid terminal, and record the formal terminal identifier of the valid terminal. The temporary terminal identifier assigned to the terminal may satisfy certain requirements of the registration or ranging of the terminal. For example, when the terminal transmits the logic registration code through a message for reporting a password, the terminal is first assigned with a temporary terminal identifier to accomplish the subsequent ranging process, and then transmits the logic registration code to the central office end through the message for reporting a password.

The process of recording the terminal serial number of the valid terminal by the central office end may be realized in the following manner. The OLT records the terminal serial number of the valid terminal, or the OLT and other equipments at the central office end such as the operation management system all record the terminal serial number of the valid terminal. The OLT may acquire and record the terminal serial number of the valid terminal by receiving the terminal serial number transmitted from the valid terminal. The OLT may transmit the recorded terminal serial number of the valid terminal to other network equipments such as the operation management system at the central office end, such that the operation management system may acquire and record the automatically detected terminal serial number by receiving the terminal serial number of the valid terminal transmitted from the OLT.

The operation management system is capable of managing the terminal serial number and the terminal identifier recorded thereby, and also performing maintenance management on the OLT and the terminal according to the terminal serial number and the terminal identifier recorded thereby.

The method for detecting and authenticating a terminal provided in the embodiments of the present invention is illustrated in detail below with the accompanying drawings.

Figure 2:
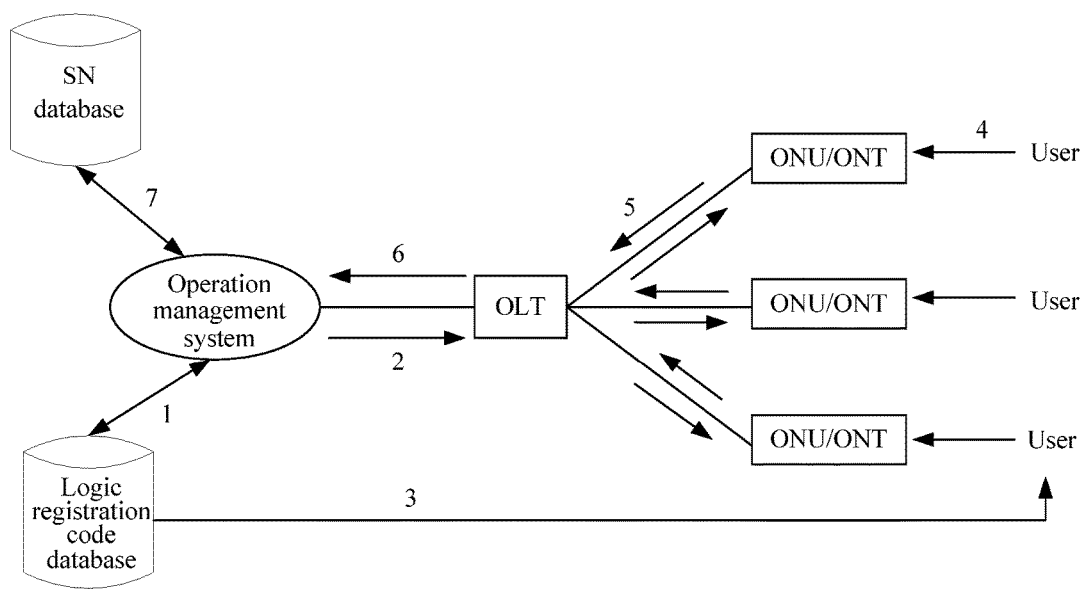
FIG. 2 is a schematic view illustrating the process of a method for detecting and authenticating a terminal according to an embodiment of the present invention.

The process of the method for detecting and authenticating a terminal according to the embodiments of the present invention is shown in FIG. 2.

In FIG. 2, Step 1: The operation management system generates and stores a logic registration code for an ONU/ONT used by the user who files a service application. For example, the operation management system stores the generated logic registration code in a logic registration code database. The operation management system may generate the logic registration code in a specific format determined by the operation management system. When the operation management system generates the logic registration code, it is ensured that the generated logic registration code is unique under a PON port.

Step 2: The operation management system generates a service parameter to be configured for the ONU/ONT according to the service applied by the user. The operation management system delivers the service parameter to be configured for the ONU/ONT and the logic registration code of the ONU/ONT to the OLT.

Step 3: The operation management system transmits information about the logic registration code of the ONU/ONT to the user.

Step 4: After being powered on, the ONU/ONT receives the externally input logic registration code. For example, the ONU/ONT receives the externally input logic registration code by providing local command lines, Web pages, or through other external media.

Step 5: The ONU/ONT reports the logic registration code to the OLT during the registration. The OLT receives the logic registration code reported by the ONU/ONT, and determines whether the logic registration code reported by the ONU/ONT matches with the logic registration code stored therein. If the logic registration code reported by the ONU/ONT matches with the logic registration code stored therein, the authentication succeeds and the OLT determines that the ONU/ONT is the valid terminal and records the SN acquired from the valid terminal and an ONU-ID (the terminal identifier) assigned to the valid terminal, as a result, the OLT successfully detects the valid terminal. If the logic registration code reported by the ONU/ONT does not match with the logic registration code stored therein, the authentication fails, and the OLT determines that the ONU/ONT is the invalid terminal, as a result, the registration of the terminal terminates.

Step 6: After the registration of the ONU/ONT succeeds, the OLT reports the detected terminal SN transmitted from the valid terminal to the operation management system. The OLT may also report a corresponding relationship between the SN and the terminal identifier to the operation management system.

Step 7: The operation management system stores the received terminal SN, for example, in an SN database. The operation management system may perform maintenance management on the OLT and the ONU/ONT according to the stored terminal SN.

In the above Step 5, the ONU/ONT may transmit the logic registration code through a message for reporting a password, i.e. the ONU/ONT carries the logic registration code in a parameter field of the message for reporting a password, and reports the message for reporting a password to the OLT. The logic registration code may also be transmitted between the OLT and the ONU/ONT through a newly set message for requesting a logic registration code or a message for reporting a logic registration code. The newly set message for requesting a logic registration code and the message for reporting a logic registration code are both physical layer operation and maintenance (PLOAM) messages. The structures of the aforementioned two newly defined PLOAM messages are shown in Tables 1 and 2.

TABLE 1

PLOAM message for requesting a logic registration code by the OLT in the downlink direction
Message for Requesting Logic Registration Code

| Byte | Content | Description |
| --- | --- | --- |
| 1 | ONU-ID | ONU/ONT ID Index |
| 2 | Message ID | Message ID |
| 3-12 | Reserved | |

In Table 1, the ONU-ID of the first byte is configured to carry the ONU-ID assigned to the terminal by the central office end, the Message ID of the second byte is configured to identify the message as a message for requesting a logic registration code, and the third to the twelfth bytes are reserved bytes.

TABLE 2

PLOAM message for reporting a logic registration code by the OLT in the uplink direction
Message for Reporting Logic Registration Code

| Byte | Content | Description |
| --- | --- | --- |
| 1 | ONU-ID | ONU/ONT ID Index |
| 2 | Message ID | Message ID |
| 3 | Xxxxxxxx | Logic Registration Code (Byte 1) |
| 4-11 | ... | ... |
| 12 | Xxxxxxxx | Logic Registration Code (Byte 10) |

In Table 2, the ONU-ID of the first byte is configured to carry the ONU-ID assigned to the terminal by the central office end, the Message ID of the second byte is configured to identify the message as a message for reporting a logic registration code, and the third to the twelfth bytes are configured to carry the logic registration code of the terminal.

Tables 1 and 2 merely show specific examples of the message for requesting a logic registration code and the message for reporting a logic registration code. In the embodiments of the present invention, the message for transmitting the logic registration code is not limited to the above examples.

The aforementioned Step 5 may be realized by the following two methods.

Figure 3:
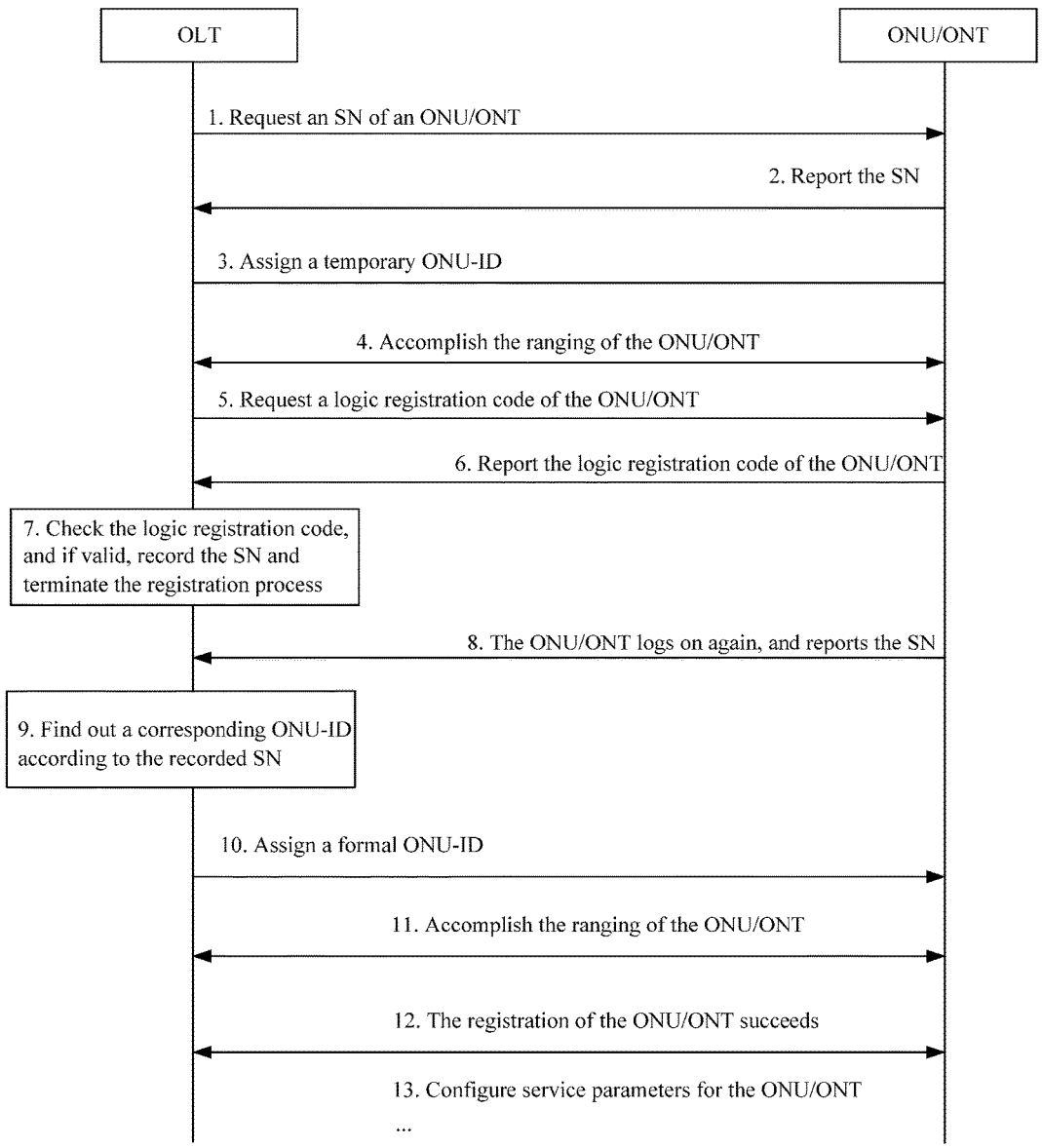
FIG. 3 is a first timing chart of the method for detecting and authenticating a terminal according to an embodiment of the present invention.

Method 1: an automatic terminal detection and authentication process of first assigning a temporary ONU-ID and then assigning a formal ONU-ID is shown in FIG. 3.

In FIG. 3, Step 1: The OLT sends a message for requesting to report the SN to all the ONUs/ONTs.

Step 2: The ONU/ONT receives the message for requesting to report the SN sent by the OLT, and reports its SN to the OLT in response to the message.

Step 3: The OLT receives the SN reported by the ONU/ONT, and determines whether the SN has been recorded, i.e. determines whether the received SN matches with the stored SN. If the OLT determines that the received SN has been recorded, Step 9 is performed. If the OLT determines that the received SN has not been recorded, the OLT assigns a temporary ONU-ID to the ONU/ONT and sends the temporary ONU-ID to the ONU/ONT, and Step 4 is performed. When the ONU/ONT assigns the temporary ONU-ID, the OLT may select one from the unused ONU-IDs as the temporary ONU-ID.

Step 4: The OLT performs data interaction with the ONU/ONT to which the temporary ONU-ID is assigned, so as to accomplish the ranging of the ONU/ONT assigned with the temporary ONU-ID.

Step 5: The OLT sends a message for requesting a logic registration code to the ONU/ONT, and the message for requesting a logic registration code may be realized by a message for requesting a password or a newly defined message for requesting a logic registration code.

Step 6: The ONU/ONT receives the message for requesting a logic registration code sent by the OLT, and reports its logic registration code to the OLT. The ONU/ONT may carry the logic registration code in a message for reporting a password and transmit the message to the OLT, or carry the logic registration code in a newly defined message for reporting a logic registration code and transmit the message to the OLT.

Step 7: The OLT acquires the logic registration code of the ONU/ONT from the received message, and checks the acquired logic registration code according to parameters pre-configured by the operation management system, i.e. the OLT determines whether the acquired logic registration code matches with the logic registration code stored therein. If the acquired logic registration code matches with the logic registration code stored therein, the OLT determines that the ONU/ONT is the valid terminal, then records the SN of the ONU/ONT, and terminates the registration of the ONU/ONT, and Step 8 is performed. If the acquired logic registration code does not match with the logic registration code stored therein, the OLT determines that the ONU/ONT is the invalid terminal, then directly terminates the registration, and stops performing the subsequent process.

Step 8: The ONU/ONT logs on again to continue the subsequent registration process, and the ONU/ONT reports its SN to the OLT. The OLT receives the SN reported by the ONU/ONT, and checks whether the SN has been recorded. If the OLT determines that the received SN has been recorded, Step 9 is performed; and if the OLT determines that the received SN has not been recorded, the OLT assigns a temporary ONU-ID to the ONU/ONT and sends the temporary ONU-ID to the ONU/ONT, and Step 4 is performed.

In Step 8, as the OLT has already recorded the SN of the ONU/ONT, Step 9 is performed directly.

Step 9: The OLT finds out a corresponding ONU-ID, and adopts the corresponding ONU-ID as a formal ONU-ID. The formal ONU-ID may be the temporary ONU-ID, i.e. the OLT adopts the temporary ONU-ID assigned previously to the ONU/ONT as the formal ONU-ID of the ONU/ONT. The OLT may bind the SN of the ONU/ONT with the formal ONU-ID of the ONU/ONT.

Step 10: The OLT assigns the found formal ONU-ID to the ONU/ONT.

Step 11: The OLT performs data interaction with the ONU/ONT to which the formal ONU-ID is assigned, so as to accomplish the ranging of the ONU/ONT assigned with the formal ONU-ID.

Step 12: The OLT performs data interaction with the ONU/ONT to which the formal ONU-ID is assigned, so as to accomplish the registration of the ONU/ONT, and after the registration succeeds, Step 13 is performed.

Step 13: The OLT performs data interaction with the ONU/ONT that succeeds in the registration, so as to configure service parameters for the ONU/ONT that succeeds in the registration.

In the above description of FIG. 3, the logic registration code of the ONU/ONT may be the ONU-ID of the ONU/ONT, i.e. in the above Step 6 shown in FIG. 3, the logic registration code reported to the OLT by the ONU/ONT is the ONU-ID of the ONU/ONT. That is to say, in the above Step 1 shown in FIG. 2, the logic registration code generated by the operation management system for the ONU/ONT used by the user who files the service application is the ONU-ID.

Certainly, in the above description of FIG. 3, the logic registration code of the ONU/ONT may also be different from the ONU-ID of the ONU/ONT. In the embodiments of the present invention, the specific implementation manner of the logic registration code of the ONU/ONT is not limited herein.

In addition, in the above description of FIG. 3, the operation management system and the OLT may identify the terminal through a management terminal identifier, and the OLT and the ONU/ONT may identify the terminal through the ONU-ID. The management terminal identifier may adopt the ONU-ID or any other identifier. When the management terminal identifier between the operation management system and the OLT adopts the ONU-ID, the operation management system, the OLT, and the ONU/ONT all employ the ONU-ID to identify the ONU/ONT.

Figure 4:
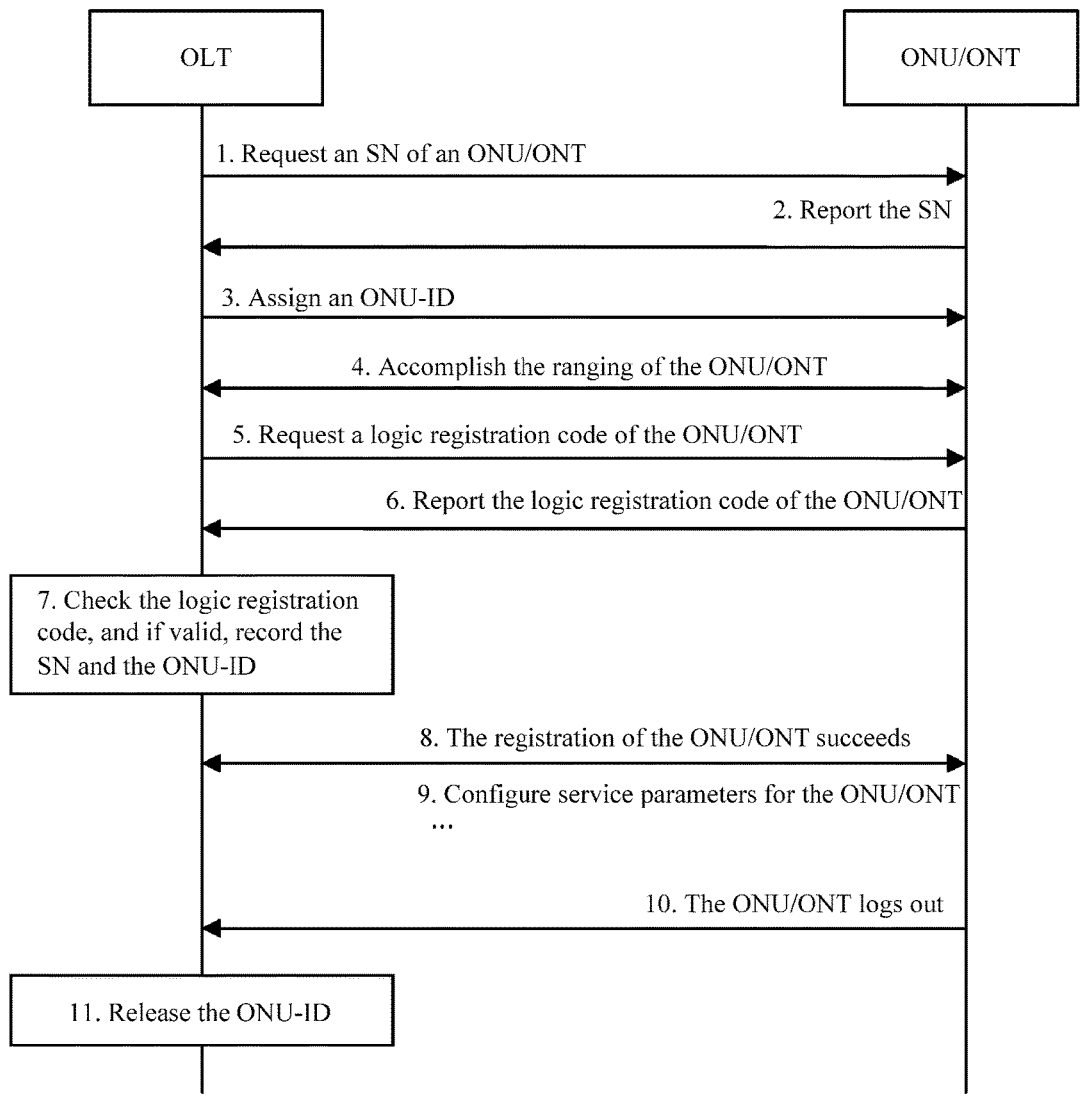
FIG. 4 is a second timing chart of the method for detecting and authenticating a terminal according to an embodiment of the present invention.

Method 2: the process of first assigning the ONU-ID and then automatically detecting and authenticating the terminal is shown in FIG. 4.

In FIG. 4, Step 1: The OLT sends a message for requesting to report the SN to all the ONUs/ONTs.

Step 2: The ONU/ONT receives the message for requesting to report the SN sent by the OLT, and reports its SN to the OLT in response to the message.

Step 3: After receiving the SN reported by the ONU/ONT, the OLT selects one from the unused ONU-IDs as a formal ONU-ID, and assigns the selected ONU-ID to the ONU/ONT.

Step 4: The OLT performs data interaction with the ONU/ONT to which the ONU-ID is assigned, so as to accomplish the ranging of the ONU/ONT assigned with the ONU-ID.

Step 5: The OLT sends a message for requesting a logic registration code to the ONU/ONT, and the message for requesting a logic registration code may be realized by a message for requesting a password or a newly defined message for requesting a logic registration code.

Step 6: The ONU/ONT receives the message for requesting a logic registration code sent by the OLT, and reports its logic registration code to the OLT in response to the message. The ONU/ONT may carry the logic registration code in a message for reporting a password and transmit the message to the OLT, or carry the logic registration code in a newly defined message for reporting a logic registration code and transmit the message to the OLT.

Step 7: The OLT acquires the logic registration code of the ONU/ONT from the received message, and checks the acquired logic registration code according to parameters pre-configured by the operation management system, i.e. the OLT determines whether the acquired logic registration code matches with the logic registration code stored therein. If the acquired logic registration code matches with the logic registration code stored therein, the OLT determines that the ONU/ONT is the valid terminal, then records the serial number of the ONU/ONT, and binds the serial number of the ONU/ONT with the ONU-ID of the ONU/ONT, and Step 8 is performed. If the acquired logic registration code does not match with the logic registration code stored therein, the OLT determines that the ONU/ONT is the invalid terminal, then directly terminates the registration, and stops performing the subsequent process.

Step 8: The OLT performs data interaction with the valid ONU/ONT, so as to accomplish the registration of the ONU/ONT, and after the registration succeeds, Step 9 is performed.

Step 9: The OLT performs data interaction with the ONU/ONT that succeeds in the registration, so as to configure service parameters for the ONU/ONT that succeeds in the registration.

Step 10: When intending to log out, the ONU/ONT sends a log-out message to the OLT.

Step 11: The OLT receives the log-out message sent by the ONU/ONT, and releases the binding between the SN of the ONU/ONT and the ONU-ID of the ONU/ONT.

In the above description of FIG. 4, the operation management system and the OLT may identify the terminal through a management terminal identifier, and the OLT and the ONU/ONT may identify the terminal through the ONU-ID. The management terminal identifier may adopt the ONU-ID or any other identifier. When the management terminal identifier between the operation management system and the OLT does not adopt the ONU-ID, the OLT in Step 7 binds the SN of the ONU/ONT, the ONU-ID of the ONU/ONT, and the management terminal identifier of the ONU/ONT, and in Step 11, the OLT releases the binding of the SN of the ONU/ONT, the ONU-ID of the ONU/ONT, and the management terminal identifier of the ONU/ONT.

Seen from the above description of the method, in the embodiments of the present invention, it is unnecessary to statically configure the terminal serial number in the OLT at the central office end or the operation management system. Instead, a logic registration code is adopted during the detection and authentication process, so that after the authentication is passed, the terminal serial number acquired from the valid terminal and the terminal identifier assigned to the valid terminal are recorded, and thus the OLT at the central office end may automatically detect and authenticate the terminal. Besides, the OLT transmits the terminal serial number and the terminal identifier acquired through automatic detection and authentication to the operation management system, so that the operation management system may dynamically acquire the terminal serial number and the terminal identifier, and the process of statically configuring the terminal serial number and the terminal identifier by the operation management system is avoided. When the terminal needs to be replaced due to problems such as a failure, the logic registration code in the original terminal may also be used in the newly replaced terminal, and thereby the process of statically reconfiguring the terminal serial number by the operation management system due to the replacement of the terminal is avoided. Based on the above, the operation management system may dynamically manage the terminal serial number and the terminal identifier, and easily maintain the OLT and the terminal by using the dynamically acquired terminal serial number and the terminal identifier. Therefore, the maintenance cost of the operation management system, the OLT, and the terminal is lowered, the flexibility of terminal detection and authentication is improved, and the maintainability of the central office end and the terminal is also enhanced.

In an embodiment of the present invention, a network equipment located at the central office end in the PON is also provided. The network equipment may be an OLT at the central office end, and includes a first storing module, a receiving module, a judging module, an assigning module, and a second storing module.

The first storing module is adapted to store a logic registration code of a terminal. The logic registration code stored in the first storing module may be configured by an operation management system at the central office end.

The receiving module is adapted to receive a logic registration code and a terminal serial number sent from the terminal. The receiving module may request the terminal serial number and the logic registration code from the terminal, and then receive the terminal serial number and the logic registration code transmitted from the terminal according to the request.

The judging module is adapted to judge whether the logic registration code received by the receiving module matches with the logic registration code stored in the storing module, so as to judge whether the terminal is the valid terminal or not. The judging module outputs a judgment result, i.e. the judging module outputs information about matching or not matching.

The assigning module is adapted to assign and output the terminal identifier to the terminal. The assigning module may assign the terminal identifier to the terminal before or after the judgment of the judging module.

The second storing module is adapted to store the terminal serial number received by the receiving module and the terminal identifier output by the assigning module after the judging module outputs the judgment result of matching. The terminal serial number and the terminal identifier stored in the second storing module are the automatically detected terminal serial number and the terminal identifier of the valid terminal.

The network equipment optionally includes a reporting module. The reporting module is adapted to report the terminal serial number stored by the second storing module to the operation management system at the central office end. The terminal serial number reported by the reporting module to the operation management system is the terminal serial number of the valid terminal automatically detected by the network equipment where the module is located.

According to different implementations of realizing the automatic detection and authentication, the above assigning module and receiving module also have different operation modes. Two specific implementation methods are illustrated as examples below.

Method 1: The assigning module includes a judging sub-module and an assigning sub-module, and the receiving module includes a first requesting sub-module, a second requesting sub-module, and a receiving sub-module.

The first requesting sub-module sends a message for requesting to report the SN to all the ONUs/ONTs. The receiving sub-module receives the SN reported by the ONU/ONT. After the receiving sub-module receives the SN reported by the ONU/ONT, the judging sub-module determines whether the SN received by the receiving sub-module has been recorded in the second storing module, i.e. determines whether the received SN matches with the SN stored in the second storing module. If it is determined that the SN received by the receiving sub-module has been recorded by the second storing module, the judging sub-module notifies the assigning sub-module to assign a formal ONU-ID, and if it is determined that the SN received by the receiving sub-module has not been recorded by the second storing module, the judging sub-module notifies the assigning sub-module to assign a temporary ONU-ID.

After receiving the message of assigning the temporary ONU-ID from the judging sub-module, the assigning sub-module assigns the temporary ONU-ID to the terminal, and triggers the network equipment to perform ranging on the terminal. The network equipment performs data interaction with the ONU/ONT to which the temporary ONU-ID is assigned, so as to accomplish the ranging of the ONU/ONT assigned with the temporary ONU-ID.

After the network equipment accomplishes the ranging, the second requesting sub-module sends a message for requesting a logic registration code to the ONU/ONT. The message for requesting a logic registration code may be realized by a message for requesting a password or a newly defined message for requesting a logic registration code. The receiving sub-module acquires the logic registration code reported by the ONU/ONT from the received message.

After the receiving sub-module receives the logic registration code, the judging module checks the logic registration code received by the receiving sub-module according to the logic registration code stored in the first storing module, i.e. the judging module determines whether the logic registration code received by the receiving sub-module matches with the logic registration code stored in the first storing module. The judging module determines that the ONU/ONT is the valid terminal and notifies the second storing module to record the SN of the ONU/ONT, if the logic registration code received by the receiving sub-module matches with the logic registration code stored in the first storing module; the judging module determines that the ONU/ONT is the invalid terminal and directly terminates the registration process, if the logic registration code received by the receiving sub-module does not match with the logic registration code stored in the first storing module.

The ONU/ONT logs on again to perform the subsequent registration process, and the ONU/ONT reports its SN to the OLT. After the receiving sub-module receives the SN reported by the ONU/ONT, the judging sub-module checks whether the SN has been recorded in the second storing module. If it is determined that the SN received by the receiving sub-module has been recorded in the second storing module, the judging sub-module notifies the assigning sub-module to assign the formal ONU-ID to the terminal. If it is determined that the SN received by the receiving sub-module has not been recorded in the second storing module, the judging sub-module notifies the assigning sub-module to assign the temporary ONU-ID to the terminal.

During the re-log on of the terminal, the second storing module has recorded the SN of the ONU/ONT. Therefore, after the receiving sub-module receives the SN, the assigning sub-module finds out the ONU-ID, then assigns the found ONU-ID to the terminal as the formal ONU-ID, and triggers the network equipment to perform ranging on the terminal.

The network equipment performs data interaction with the ONU/ONT to which the formal ONU-ID is assigned, so as to accomplish the ranging of the ONU/ONT assigned with the formal ONU-ID. The network equipment performs data interaction with the ONU/ONT to which the formal ONU-ID is assigned, so as to accomplish the registration of the ONU/ONT. After the registration succeeds, the OLT performs data interaction with the ONU/ONT that succeeds in the registration, so as to assign service parameters to the ONU/ONT that succeeds in the registration. In addition, when the management terminal identifier between the operation management system and the OLT adopts the ONU-ID, the second storing module stores the binding relationship between the SN and the ONU-ID.

Method 2: The receiving module includes a first requesting sub-module, a third requesting sub-module, and a receiving sub-module.

The first requesting sub-module sends a message for requesting to report the SN to all the ONUs/ONTs. The receiving sub-module receives the SN reported by the ONU/ONT. After the receiving sub-module receives the SN reported by the ONU/ONT, the assigning module assigns the ONU-ID to the terminal, and triggers the network equipment to perform ranging on the terminal. The network equipment performs data interaction with the ONU/ONT to which the ONU-ID is assigned, so as to accomplish the ranging of the ONU/ONT assigned with the ONU-ID.

After the network equipment accomplishes the ranging, the third requesting sub-module sends a message for requesting a logic registration code to the ONU/ONT. The message for requesting a logic registration code may by realized by a message for requesting a password or a newly defined message for requesting a logic registration code. The receiving sub-module acquires the logic registration code reported by the ONU/ONT from the received message.

After the receiving sub-module receives the logic registration code, the judging module checks the logic registration code received by the receiving sub-module according to the logic registration code stored in the first storing module, i.e. the judging module determines whether the logic registration code received by the receiving sub-module matches with the logic registration code stored in the first storing module. The judging module determines that the ONU/ONT is the valid terminal and notifies the second storing module to record the SN of the ONU/ONT, if the logic registration code received by the receiving sub-module matches with the logic registration code stored in the first storing module; the judging module determines that the ONU/ONT is the invalid terminal and directly terminates the registration process, if the logic registration code received by the receiving sub-module does not match with the logic registration code stored in the first storing module.

The network equipment performs data interaction with the ONU/ONT to which the formal ONU-ID is assigned, so as to accomplish the registration of the ONU/ONT. After the registration succeeds, the OLT performs data interaction with the ONU/ONT that succeeds in the registration, so as to assign service parameters to the ONU/ONT that succeeds in the registration.

When logging out, the ONU/ONT sends a log-out message to the OLT. After the OLT receives the log-out message sent by the ONU/ONT, the second storing module releases the information about the ONU/ONT stored therein. When the management terminal identifier between the operation management system and the OLT does not adopt the ONU-ID, the information about the ONU/ONT stored in the second storing module includes the binding relationship of the SN of the ONU/ONT, the management terminal identifier of the ONU/ONT, and the ONU-ID of the ONU/ONT.

In an embodiment of the present invention, an operation management system at the central office end in the PON is further provided. The system includes a logic registration code module and a serial number module.

The logic registration code module is adapted to store the logic registration code, assign the logic registration code to the user, and transmit the logic registration code assigned to the user to the OLT. The logic registration code module may transmit the logic registration code and the service parameters to the OLT. The detailed description is given in the above implementation manner of the method.

The serial number module is adapted to receive the SN of the valid terminal transmitted by the OLT. The SN transmitted by the OLT is the SN of the valid terminal automatically detected by the OLT. The serial number module may store the received SN in an SN database. The operation management system also includes a module for managing the SN.

In an embodiment of the present invention, a terminal equipment in the PON is further provided. The terminal equipment includes a receiving and storing module and a transmitting module.

The receiving and storing module is adapted to receive, store, and input the logic registration code of the terminal equipment where the module is located. The receiving and storing module may receive the externally input logic registration code by using local command lines and Web pages provided by the terminal equipment or by others manners. The detailed description is given in the above implementation manner of the method.

The transmitting module is adapted to send the logic registration code stored in the receiving and storing module to the central office end according to the request of the central office end received by the terminal equipment where the module is located. For example, the transmitting module carries the logic registration code in a message for reporting a password and transmits the message to the OLT. Or, the transmitting module carries the logic registration code in a newly defined message specialized for transmitting a logic registration code and transmits the message to the OLT. The detailed description is given in the above implementation manner of the method.

Finally, it should be understood that the above embodiments are only used to explain, but not to limit the technical solution of the present invention. In despite of the detailed description of the present invention with referring to above embodiments, it should be understood that various modifications, changes or equivalent replacements can be made by those skilled in the art without departing from the scope of the present invention and covered in the claims of the present invention.

What is claimed is:

1. A method for authentication in a passive optical network (PON) comprising an optical line terminal (OLT) and an optical network unit (ONU), the method comprising:

receiving, by the OLT, a first terminal serial number of the ONU;

receiving, by the OLT, a first logic registration code of the ONU, when the first terminal serial number does not match a second terminal serial number stored on the OLT; and recording, by the OLT, the first terminal serial number when the first logic registration code matches a second logic registration code stored on the OLT.

2. The method according to claim 1, further comprising:
assigning, by the OLT, a temporary ONU-ID to the ONU when the first terminal serial number does not match the second terminal serial number.

3. The method according to claim 1, further comprising:
adopting, by the OLT, an ONU-ID as a formal ONU-ID to the ONU when the first terminal serial number matches with the second terminal serial number stored on the OLT.

4. The method according to claim 3, further comprising:
receiving, by the OLT, a log-out message from the ONU; and in response to the reception of the log-out message, releasing, by the OLT, a binding relationship between the first terminal serial number of the ONU and the ONU-ID.

5. The method according to claim 1, wherein the first logic registration code is different from the first terminal serial number of the ONU.

6. An optical line terminal (OLT) comprising:
a first receiver, configured to receive a first terminal serial number of an ONU;

the first receiver, configured to receive a first logic registration code of the ONU, when the first terminal serial number does not match the second terminal serial number; and a recorder, configured to record the first terminal serial number when the first logic registration code matches the second logic registration code.

7. The OLT according to claim 6, further comprising:
an assigning module, configured to assign a temporary ONU-ID to the ONU when the first terminal serial number does not match the second terminal serial number.

8. The OLT according to claim 6, further comprising:
an adopting module, configured to adopt an ONU-ID as a formal ONU-ID to the ONU when the first terminal serial number matches with the second terminal serial number stored on the OLT.

9. The OLT according to claim 8, wherein the first receiver is configured to receive a log-out message from the ONU, and release a binding relationship between the first terminal serial number of the ONU and the ONU-ID in response to the reception of the log-out message.

10. The OLT according to claim 6, wherein the first logic registration code is different from the first terminal serial number of the ONU.

11. A method performed on an optical network unit (ONU), the method comprising:
transmitting, by the ONU, a first terminal serial number of the ONU to an optical line terminal (OLT) when the ONU logs on;

receiving, by the ONU, a request for a logic registration code from the OLT, when the central office determines that the first terminal serial number does not match a second terminal serial number; and in response to the request, transmitting, by the ONU, a first logic registration code to the OLT for authentication;

receiving, by the ONU, a ONU identifier (ONU-ID), when the first logic registration code matches the second logic registration code.

12. The method according to claim 11, further comprising:
receiving, by the ONU, a temporary ONU-ID from the OLT when the first terminal serial number does not match the second terminal serial number.

13. The method according to claim 11, wherein the logic registration code is different from the first terminal serial number of the ONU.

14. The method according to claim 11, wherein when the ONU logs on at a second time, the method further comprising:
transmitting, by the ONU, the first terminal serial number of the ONU to the OLT without sending the logic registration code, wherein the first terminal serial number transmitted at the second time is used by the OLT to match a stored terminal serial number received from the ONU when the ONU logs on at a first time.

15. An optical network unit (ONU) comprising:
a memory, configured to store a terminal serial number and a logic registration code;

a transmitter, configured to transmit a first terminal serial number to an optical line terminal (OLT) when the ONU logs on; and a second receiver, configured to receive a request for a logic registration code from the OLT, when the OLT determines that the first terminal serial number does not match a second terminal serial number stored on the OLT;

wherein the transmitter is further configured to transmit a logic registration code to the OLT in response to the request for logical registration code; and wherein the second receiver is further configured to receive a ONU identifier (ONU-ID), when the first logic registration code matches the second logic registration code stored on the OLT.

16. The ONU according to claim 15, wherein the first logic registration code is different from the first terminal serial number of the ONU, and is different from the ONU-ID that is assigned by the OLT to the ONU.

17. The ONU according to claim 15, wherein when the ONU logs on at a second time, the transmitter is configured to transmit the first terminal serial number to the central office without sending the logic registration code, wherein the first terminal serial number transmitted at the second time is used by the central office to match a stored terminal serial number received from the ONU when the ONU logs on at the first time.

* * * * *